(12) United States Patent
Steinmann

(10) Patent No.: US 9,803,780 B2
(45) Date of Patent: Oct. 31, 2017

(54) SEALING PANEL FOR COOLING APPLIANCE COIL CLEANING

(71) Applicant: Jacob F. Steinmann, Ridgefield, CT (US)

(72) Inventor: Jacob F. Steinmann, Ridgefield, CT (US)

(73) Assignee: CoilPod LLC, Yorktown Heights, NY (US)

( * ) Notice: Subject to any disclaimer, the term of this patent is extended or adjusted under 35 U.S.C. 154(b) by 19 days.

(21) Appl. No.: 14/757,075

(22) Filed: Nov. 16, 2015

(65) Prior Publication Data

US 2016/0201977 A1    Jul. 14, 2016

Related U.S. Application Data

(60) Provisional application No. 62/123,515, filed on Nov. 19, 2014.

(51) Int. Cl.
| | |
|---|---|
| *F16L 5/10* | (2006.01) |
| *F16L 5/02* | (2006.01) |
| *F25B 47/00* | (2006.01) |
| *F25D 23/00* | (2006.01) |

(52) U.S. Cl.
CPC ............... *F16L 5/02* (2013.01); *F25B 47/00* (2013.01); *F25D 23/003* (2013.01)

(58) Field of Classification Search
CPC ... F16J 15/02; F16J 15/04; F16J 15/14; B08B 5/00; B08B 5/02; B08B 9/0322; F16L 5/02; F25B 4/00; F25C 23/003
See application file for complete search history.

(56) References Cited

U.S. PATENT DOCUMENTS

| | | | | |
|---|---|---|---|---|
| 3,510,905 | A * | 5/1970 | Bannert ................... | B60S 3/00 15/345 |
| 3,978,547 | A * | 9/1976 | Lawson ................ | B08B 15/026 15/345 |
| 4,865,401 | A * | 9/1989 | Jacobson .................. | B60S 5/00 134/21 |
| 4,928,348 | A * | 5/1990 | Clayton ................ | B08B 15/026 15/345 |
| 8,590,100 | B2 * | 11/2013 | Agorichas ................. | B08B 5/02 15/345 |

* cited by examiner

*Primary Examiner* — Gilbert Y Lee
(74) *Attorney, Agent, or Firm* — Richard P. Fennelly

(57) ABSTRACT

A planar sealing panel member for cleaning the condenser coils of a cooling appliance. This member has at least one hole in its surface to accommodate a hose supplying compressed air. It also has affixation means on its surface so as to hold the sealing panel against the cooling appliance adjacent the opening(s) holding the condenser coils to form a substantially sealed enclosure along with the appliance structure within which the coils reside when cleaned using compressed air.

6 Claims, 2 Drawing Sheets

SEALING PANEL FOR COOLING APPLIANCE COIL CLEANING

This application claims the benefit of U.S. Ser. No. 62/123,515, filed Nov. 19, 2014.

The present invention relates to a novel sealing panel that can be used to seal the opening(s) of a plug-in cooling appliance that are adjacent to and lead to the appliance's condenser coils so that the coils can be effectively cleaned using compressed air or a combination of compressed air and vacuum. The sealing panel has at least one opening to accommodate a hose supplying compressed air which is used in the cleaning of the coils once the panel has been affixed to substantially seal off the coils inside the appliance chamber where they reside. The invention is broadly applicable to many types of appliances as will become apparent from the description that follows.

The present invention is further understood by reference to the Figures which are as follows.

Figure 1:
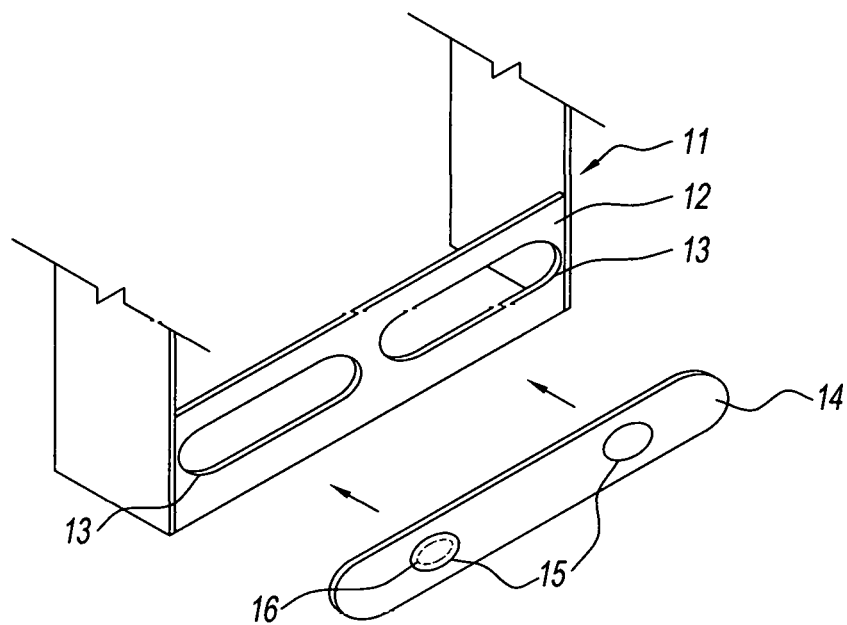
FIG. 1 is a perspective view showing the base area of a residential-type refrigerator, for example, and the sealing panel of the present invention with the dotted arrows showing the direction in which the panel is moved into place jut before a coil cleaning operation is to be commenced.

As illustrated in FIG. 1, a conventional residential refrigerator 11, for example, has a base area 12 with openings 13 in its front surface that allow for air flow over the condenser coils (not shown) lying in the interior of the refrigerator adjacent the floor on which the refrigerator rests and below the refrigerator's cooling enclosure. This is a very common configuration to a class of refrigerator that might be termed "bottom-mounted condenser coil refrigerators" as is notoriously well known to persons in the art. A decorative grille (also not shown) normally covers this base area. This grille would be removed just before the cleaning operation using the present invention as FIG. 1 illustrates.

The condenser coils in the above type of refrigerator, like those in any type of cooling appliance, need periodic cleaning in order that the refrigerator run with maximum efficiency. Being exposed to the air, they readily become fouled with dust, lint and other debris. The normal practice has been to use a combination of brushing the coils, sometimes with specially designed coil brushes, to loosen or remove the debris from the coils and vacuuming to finalize the cleanup.

Coil cleaning using compressed air has also been employed in various type appliance settings. For condenser coil units of differing configuration than the bottom-mounted condenser coil unit contemplated herein, the use of compressed air with a wet towel, as the debris capture medium, has been in conventional use for some time. Only recently, there have been some attempts to develop more engineered dust containment devices for such units to dispense with the "wet towel" approach and contain blown off dust when using compressed air/vacuum: see U.S. Pat. Nos. 8,182,611 and 8,590,100; and U.S. Patent Application Publication Nos. 2013/0263403 and 2013/0160800, as exemplary. The present invention relates to a substantially simpler and less costly dust containment article than the ones shown in these patent documents when using compressed air, preferably with vacuum, to do condenser coiling cleaning.

Another example of a dust containment article for use with residential bottom-mounted condenser coil refrigerators is shown in U.S. Pat. No. 6,295,696 to R. Harmon. The dust containment article taught therein is a skirt-like article extending entirely around the refrigerator structure with access holes for compressed air and vacuum in the front and rear surfaces of the refrigerator body, respectively.

Figure 2:
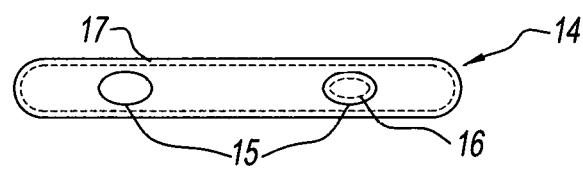
FIG. 2 is a planar view showing the side of the sealing panel intended to be placed against the surface of the refrigerator.

The cleaning aid for the condenser coil cleaning contemplated herein is a planar article (or sealing panel) 14 that is configured to fit over the refrigerator's base area 12 containing the openings 13 that communicate with the interior chamber in which the condenser coils reside. It is designed, unlike the article shown in the aforesaid U.S. Pat. No. 6,295,696 to cover only one side of the appliance. The sealing panel, which in this case is in the form of a roughly rectangular strip, can be formed of any material that will seal the base area as will be described hereinafter: paper; clear plastic, etc. Clear plastic is preferred since the cleaning operation can be visually observed by the person doing the cleaning. The sealing panel 14 has at least one hole 15, preferably two, that will be dimensioned to fit the diameter of hose(s) supplying compressed air and, preferably, compressed air and vacuum, respectively. One or more of the holes can be provided with a temporary cover that can be affixed using VELCRO hook-loop fastener for easy removal/sealing if desired. The inward facing area 16 of the hole(s) can also be provided with a flexible stretch fabric to provide a better seal between the periphery of any hose that is inserted and the outer periphery of the hole. FIG. 2 illustrates the side of the panel 14 to be placed against the base area 12. The peripheral area 17 on this side of the panel that is defined by the dotted lines will contain a means to securely affix the strip 14 to the surface of the refrigerator during the cleaning operation. A suitable glue or series of magnets can be used for affixing the strip. If glue is used, it is desired that it be of a low tack variety so that the panel can be removed for multiple uses until it is decided by the person doing the cleaning to use a fresh panel. Before being used the first time, the side of the sealing panel of this invention holding any adhesive can be covered with removable release paper.

The cleaning operation can be done in various ways. If one hole is present, a compressed air hose alone can be used to blow debris off the coils. The chamber within which the coils, are contained in most refrigerators and other cooling appliances is fairly well sealed so that the dust and debris will largely be contained therein. By blowing from the front of the refrigerator, it is not necessary the move the refrigerator forward unless one wished to later vacuum the floor beneath the unit. Another way to do the cleaning is with two holes where a vacuum hose is preferably first inserted into one of the holes and activated to set up a slight negative pressure in the coil enclosure. Then, a compressed air hose is set up in the other hole and activated to blow off the coils with dust and debris being largely sucked out of the chamber by the vacuum.

Figure 3:
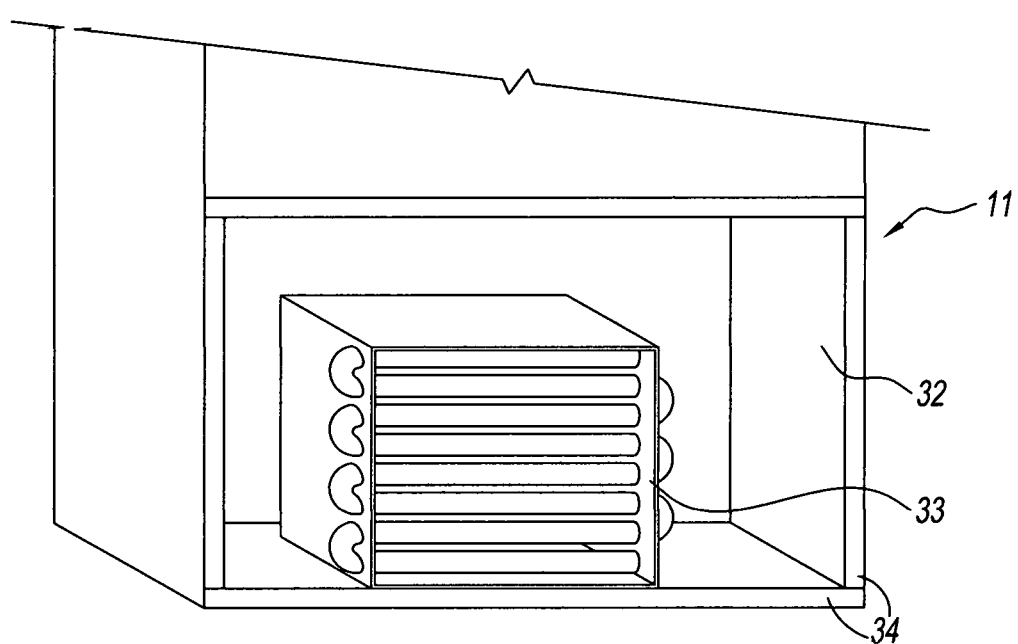
FIG. 3 is a perspective view of a commercial-type cooling appliance with a rectangular condenser coil unit and larger opening to be sealed.

FIG. 3 illustrates another type of cooling appliance 31 that may be cleaning. This unit is more common to commercial settings and could be described as of "bottom-mounted, free-standing (or self-contained) condenser coil configuration". In such a unit, the condenser coils 33 are in the form of a rectangular structure and previously have been described as being removable from the enclosure 32 holding them for cleaning, as described, for example, by using the dust containment bag described in U.S. Patent Application Publication No. 2013/0160800. In order to provide a sealing panel to clean this type of appliance, the panel's dimensions would be changed to a more rectangular or square shape, and it would be sized to match the opening shown in FIG. 3 with the affixation means lining up with the peripheral walls 34 defining the opening. Suitable hole means would be provided just as in the embodiment of the differently shaped and sized sealing panel described earlier and shown in FIGS. 1 and 2. With the present invention, there is no need to encase the coils with a dust containment bag or remove the coils from their normal position before such encasement step. This leads to a much quicker cleaning process. The standard structure of the cooling appliance within which the condenser coils reside provides substantial encasement of the coils to be cleaned once the sealing panel of the present invention is properly affixed.

In some cases the floor of the refrigerator base section on which the coils to be cleaned reside will stand above the floor holding the entire refrigerator on legs and may have vent holes in the floor of the base as well. In these cases, the planar sealing panel member can have an additional downwardly oriented skirt extending to the floor on which the entire unit resides to provide appropriate sealing. Any vent holes can also be covered with a suitable flat piece of sealing material, such as cardboard, plastic, or the like).

Unlike the aforementioned patent to Harmon, the present invention allows for the coil cleaning operation to be performed without needing to move the appliance out from the wall against which it may reside or out of its enclosure.

What is claimed:

1. A planar sealing panel member for cleaning the condenser coils of a plug-in cooling appliance comprising (1) at least one hole in its surface to accommodate a hose supplying compressed air, optionally with a second hole to hold a vacuum hose, and (2) affixation means on the surface of the panel member to hold the sealing panel against only one side of the cooling appliance adjacent the opening holding the condenser coils to form a substantially sealed enclosure within which the coils reside when cleaned using compressed air.

2. A member as claimed in claim 1 which is formed of clear plastic.

3. A member as claimed in claim 1 where the inward facing area of the hole is provided with a flexible stretch fabric.

4. A member as claimed in claim 1 having its peripheral area containing a means to affix it to the cooling appliance.

5. A member as claimed in claim 4 wherein the means to affix it to the cooling appliance comprises a glue.

6. A member as claimed in claim 1 where the member is formed of clear plastic with the inward facing area of the hole being provided with a flexible stretch material and having its peripheral area containing a glue to affix it to the cooling appliance.

* * * * *